(12) United States Patent
Zhan

(10) Patent No.: US 8,234,109 B2
(45) Date of Patent: Jul. 31, 2012

(54) METHOD AND SYSTEM FOR HIDING LOST PACKETS

(75) Inventor: Wuzhou Zhan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 12/781,694

(22) Filed: May 17, 2010

(65) Prior Publication Data

US 2010/0228542 A1 Sep. 9, 2010

Related U.S. Application Data

(63) Continuation of application No. PCT/CN2008/073067, filed on Nov. 14, 2008.

(30) Foreign Application Priority Data

Nov. 15, 2007 (CN) .......................... 2007 1 0187277

(51) Int. Cl.
  *G10L 19/14* (2006.01)
(52) U.S. Cl. .................. 704/205; 704/203; 704/207
(58) Field of Classification Search .................. 704/203, 704/205, 207
  See application file for complete search history.

(56) References Cited

U.S. PATENT DOCUMENTS

| | | | |
|---|---|---|---|
| 6,584,438 B1 * | 6/2003 | Manjunath et al. ............ | 704/228 |
| 6,691,092 B1 * | 2/2004 | Udaya Bhaskar et al. ..... | 704/265 |
| 7,145,484 B2 | 12/2006 | Moriya et al. | |
| 7,877,253 B2 * | 1/2011 | Krishnan et al. .............. | 704/225 |
| 2004/0039464 A1 * | 2/2004 | Virolainen et al. ............. | 700/94 |
| 2005/0166124 A1 | 7/2005 | Tsuchinaga et al. | |

FOREIGN PATENT DOCUMENTS

| | | |
|---|---|---|
| CN | 1708908 A | 12/2005 |
| CN | 1719507 A | 1/2006 |
| KR | 20040090567 A | 10/2004 |

(Continued)

OTHER PUBLICATIONS

Supplementary Search Report and Opinion of corresponding European Patent Application No. 08851916.0, mailed Jan. 19, 2011, 7 pages total.

(Continued)

*Primary Examiner* — Jakieda Jackson

(57) ABSTRACT

A method and system for hiding lost packets are disclosed. The method includes: obtaining a time-domain signal segment from a frame prior to a lost signal and a frame subsequent to the lost signal respectively according to periodicity of pitch and phase of the signal, and performing transformation from a time domain to a frequency domain to obtain a frequency-domain coefficient of the prior frame and a frequency-domain coefficient of the subsequent frame; interpolating values into an amplitude value of the frequency-domain coefficient of the prior frame and an amplitude value of the frequency-domain coefficient of the subsequent frame to obtain an amplitude value of the frequency-domain coefficient of multiple reconstructed signals; selecting a phase most similar to the phase of the reconstructed signals from the prior frame and/or the subsequent frame as a phase value of the frequency-domain coefficient of the reconstructed signals; and performing transformation from the frequency domain to the time domain according to the amplitude value and the phase value of the frequency-domain coefficient of the reconstructed signals to obtain time-domain signals of the reconstructed signals, and superposing the time-domain signals of the reconstructed signals to recover the lost signal.

25 Claims, 7 Drawing Sheets

FOREIGN PATENT DOCUMENTS

| WO | 0154116 A1 | 7/2001 |
|---|---|---|
| WO | 2005059900 A1 | 6/2005 |
| WO | 2006079348 A1 | 8/2006 |

OTHER PUBLICATIONS

Examination Report of corresponding European Patent Application No. 08851916.0, mailed Sep. 19, 2011, 4 pages total.

Written Opinion of corresponding PCT Application No. PCT/CN2008/073067, mailed Feb. 5, 2009, 3 pages total.

Cover page of Issued corresponding Chinese Patent No. 101437009 B, Item (56) citing prior art references, granted on Feb. 2, 2011, 22 pages total.

* cited by examiner

METHOD AND SYSTEM FOR HIDING LOST PACKETS

CROSS-REFERENCE TO RELATED APPLICATIONS

This application is a continuation of International Application No. PCT/CN2008/073067, filed on Nov. 14, 2008, which claims priority to Chinese Patent Application No. 200710187277.X, filed on Nov. 15, 2007, both of which are hereby incorporated by reference in their entireties.

FIELD OF THE INVENTION

The present invention relates to the communication field, and in particular, to a method and system for hiding lost packets.

BACKGROUND OF THE INVENTION

The Internet Protocol (IP) network was initially designed to transmit data streams which include large packets and require no real-time or reliable transmission. However, voice streams include small packets which need to be transmitted reliably in real time. When a voice packet is lost in the transmission process, there is not enough time to retransmit the lost packet. Likewise, after a voice packet is transmitted along a long route but fails to reach the intended destination at the required time of play, the packet makes no sense. Therefore, in a Voice over IP (VoIP) system, the voice packets that fail to reach the intended destination in timely manner are regarded as having been "lost".

Packet loss in a network is the primary cause for deterioration of voice Quality of Service (QoS) in the network transmission. Without effective technologies for recovering or hiding lost voice packets, even the best designed and managed IP network is incapable of providing good toll call services. Well designed packet loss solutions improve the voice transmission quality significantly.

A solution to hiding lost voice frames in the prior art is as follows: The voice signals of the frame prior to a lost frame and the frame subsequent to the lost packet are transformed to the frequency domain, and then values are interpolated into the amplitude values of the frequency-domain parameters of the prior frame and the subsequent frame, and finally the frequency-domain coefficients with interpolated values are transformed back to the time domain. This solution is detailed below with reference to FIG. 1. In FIG. 1, the waveform 101 is time-domain voice signals, which include three frames in total. One of such frames is lost. As shown in FIG. 2, the sampling in the solution to hiding lost voice frames in the prior art includes the following block:

Block 201: Fourier transformation is performed for the time-domain signal of the frame prior to the lost frame through the following formula:

$$X(n1, k) = \sum_{m=-\infty}^{\infty} x(m) \cdot w(n1 - m) \cdot e^{-j\frac{2\pi}{N}km} \quad [1]$$

In formula (1), x(m) is a voice time-domain signal; N is a frame length; w is an analysis window (also known as a transformation window) which is zero outside the interval [0, N−1] and is preferably a triangular window to reduce the calculation load; n1 is the position of the end sample point of the prior frame signal; X (n1,k) is a frequency-domain coefficient after the Fourier transformation of the prior frame; k is a discrete frequency, its value range is 0, 1, ..., N−1, and the relation between k and the angular frequency is $$\omega = \frac{2\pi}{N}k.$$

After the time-domain signal of the prior frame undergoes the Fourier transformation, the frequency-domain coefficient X (n1,k) is a complex number, and can be expressed in the equation of amplitude and phase:

$$X(n1,k)=A_{n1,k}e^{j\theta_{n1,k}} \quad [2]$$

In formula (2), $A_{n1,k}$ is the amplitude value of the $k^{th}$ frequency, and $\theta_{n1,k}$ is the phase of the $k^{th}$ frequency.

Block 202: Fourier transformation is performed for the time-domain signal of the frame subsequent to the lost frame through the following formula:

$$X(n2, k) = \sum_{m=-\infty}^{\infty} x(m) \cdot w(n2 - m) \cdot e^{-j\frac{2\pi}{N}km} \quad [3]$$

In formula (3), n2 is the position of the end sample point of the subsequent frame signal.

After the time-domain signal of the subsequent frame undergoes the Fourier transformation, the frequency-domain coefficient X (n2,k) is a complex number, and can be expressed in the equation of amplitude and phase:

$$X(n2,k)=A_{n2,k}e^{j\theta_{n2,k}} \quad [4]$$

Block 203: Values are interpolated into the amplitude value of the frequency-domain coefficient of the prior frame and the amplitude value of the frequency-domain coefficient of the subsequent frame to obtain reconstructed signals through the following formula:

$$A_{p,k} = A_{n1,k} + (A_{n2,k} - A_{n1,k}) \cdot \frac{p}{PP+1} \quad [5]$$

In formula (5), $A_{p,k}$ is the amplitude value of the frequency-domain coefficient of a reconstructed signal obtained after interpolation; the range of p is 1, 2, ..., PP; and PP is the quantity of interpolated values (namely, the quantity of reconstructed signals), which may be calculated out through the following formula:

$$PP=(lostNum+1) \cdot N/S-1 \quad [6]$$

In formula (6), S is the interval (namely, the window offset) of the sample points of the reconstructed signal frequency-domain coefficient mapped onto the time domain after the interpolation, and is generally N/2. In the formula, lostNum is the quantity of lost frames.

Block 204: Inverse Fourier transformation is performed for the frequency-domain coefficient of each reconstructed signal after the interpolation. The Fourier retransformation may be implemented through the following formula:

$$y_p(n) = \frac{1}{N}\sum_{k=0}^{N-1} X(p, k) \cdot e^{j\frac{2\pi}{N}kn} \quad [7]$$

In formula (7), $y_p(n)$ is a signal after inverse transformation; the value range of n is 0, 1, . . . , N–1; X(p,k) is the frequency-domain coefficient of a reconstructed signal after the interpolation, and is calculated through the following formula:

$$X(p,k) = A_{p,k} e^{j\Theta n1,k} \quad [8]$$

In formula (8), the amplitude is the frequency-domain amplitude of the prior frame and the subsequent frame after the interpolation, and the phase is the frequency-domain phase of the prior frame.

Block 205: After the inverse Fourier transformation, the obtained time-domain signals are superposed to generate the lost voice signals. If S=N/2 (the window offset is half of the frame length), the voice signal of the lost frame may be calculated through the following formula:

$$\hat{x}(n1 + (p-1)*S + l) = \frac{S}{W0}(y_p(l + N/2) + y_{p+1}(l)) \quad [9]$$

In formula (9), the value range of p is 1, 2, . . . , PP–1, and the value range of l is 1, 2, . . . , S. W0 is:

$$W0 = \sum_{n=-\infty}^{\infty} w(n) \quad [10]$$

The waveform 102 in FIG. 1 shows Fourier transformation and interpolation for the frame prior to the lost frame and the frame subsequent to the lost frame. The solid line triangular window at the forepart is an analysis window added for the time-domain signal of the prior frame, and the solid line triangular window at the last part is an analysis window added for the time-domain signal of the subsequent frame. The three dotted line triangular windows are the positions of the time-domain signals generated after the interpolation. The waveform 103 in FIG. 1 is a waveform generated after the solution to hiding lost packets in the prior art is applied.

As seen from the process of hiding lost packets in the prior art and the waveform 103 in FIG. 1, the window offset is set to be half of the frame length; the window length is the frame length; and each frame corresponds to two window offsets. Consequently, the reconstructed signals of two periods are generated, and the period of the generated voice signals may be inconsistent with that of the actual signals. Moreover, the setting of the position of the Fourier transformation window does not take the phase of the prior frame or the subsequent frame into consideration, and therefore, the phase of each constructed signal does not match the phase of the prior frame or the subsequent frame.

SUMMARY OF THE INVENTION

A method and system for hiding lost packets are disclosed in embodiments of the present invention to improve the accuracy of the period of the reconstructed signals and the matching precision of the phase.

A method for hiding lost packets is disclosed in an embodiment of the present invention. The method includes:

transforming a time domain signal from a time domain to a frequency domain to obtain a frequency-domain coefficient of the prior frame and a frequency-domain coefficient of the subsequent frame, wherein the time-domain signal is a time-domain signal segment obtained from a frame prior to a lost signal and a frame subsequent to the lost signal respectively according to periodicity of pitch and phase of the signal, and perform:

interpolating values into an amplitude value of the frequency-domain coefficient of the prior frame and an amplitude value of the frequency-domain coefficient of the subsequent frame to obtain an amplitude value of the frequency-domain coefficient of multiple reconstructed signals;

selecting a phase most similar to the phase of the reconstructed signals from the prior frame and/or the subsequent frame as a phase value of the frequency-domain coefficient of the reconstructed signals; and transforming the reconstructed signals from the frequency domain to the time domain according to the amplitude value and the phase value of the frequency-domain coefficient of the reconstructed signals to obtain time-domain signals of the reconstructed signals, and superposing the time-domain signals of the reconstructed signals to recover the lost signal.

A system for hiding lost packets is disclosed in an embodiment of the present invention. The system includes:

a time-frequency domain transforming module, adapted to: transform a time domain signal from a time domain to a frequency domain to obtain a frequency-domain coefficient of the prior frame and a frequency-domain coefficient of the subsequent frame, wherein the time-domain signal is a time-domain signal segment obtained from a frame prior to a lost signal and a frame subsequent to the lost signal respectively according to periodicity of pitch and phase of the signal, and perform;

a reconstructed signal frequency-domain coefficient calculating module, adapted to: interpolate values into an amplitude value of the frequency-domain coefficient of the prior frame and an amplitude value of the frequency-domain coefficient of the subsequent frame to obtain an amplitude value of the frequency-domain coefficient of multiple reconstructed signals;

a reconstructed signal frequency-domain phase selecting module, adapted to: select a phase most similar to the phase of the reconstructed signals from the prior frame and/or the subsequent frame as a phase value of the frequency-domain coefficient of the reconstructed signals;

a frequency-time domain transforming module, adapted to: transform the reconstructed signals from the frequency domain to the time domain according to the amplitude value and the phase value of the frequency-domain coefficient of the reconstructed signals to obtain time-domain signals of the reconstructed signals; and a signal recovering module, adapted to superpose the time-domain signals of the reconstructed signals to recover the lost signal.

In at least some aspects of the present invention, the frame prior to the lost signal and the frame subsequent to the lost signal are transformed from the time domain to the frequency domain according to the periodicity of the pitch and phase of the signal in the process of signal reconstruction, and values are interpolated according to the frequency-domain coefficient of the prior frame and the frequency-domain coefficient of the subsequent frame derived from the transformation to obtain the amplitude value of the frequency-domain coefficient of the reconstructed signals. A phase most similar to the phase of the reconstructed signals is selected as the phase value of the frequency-domain coefficient of the reconstructed signals. Then transformation from the frequency domain to the time domain is performed according to the amplitude value and the phase value of the frequency-domain coefficient of the reconstructed signals. Therefore, the pitch period and the phase of the reconstructed signals match those of the actual signals, thus improving the accuracy of the period and the matching precision of the phase of the reconstructed signals.

DETAILED DESCRIPTION OF THE EMBODIMENTS

The embodiments of the present invention are detailed below with reference to accompanying drawings.

In one embodiment of the present invention, the window offset of the Fourier transformation window is set to be an average of the pitch period of the signal in the frame prior to the lost frame and the pitch period of the signal in the frame subsequent to the lost frame, and the position of the Fourier transformation window is set according to the phase difference between the prior frame signal and the subsequent frame signal. Therefore, the accuracy of the period and the matching precision of the phase of the reconstructed signals are improved. The implementation process of this embodiment is shown in FIG. 3, and the corresponding waveform is shown in FIG. 4.

Figure 3:
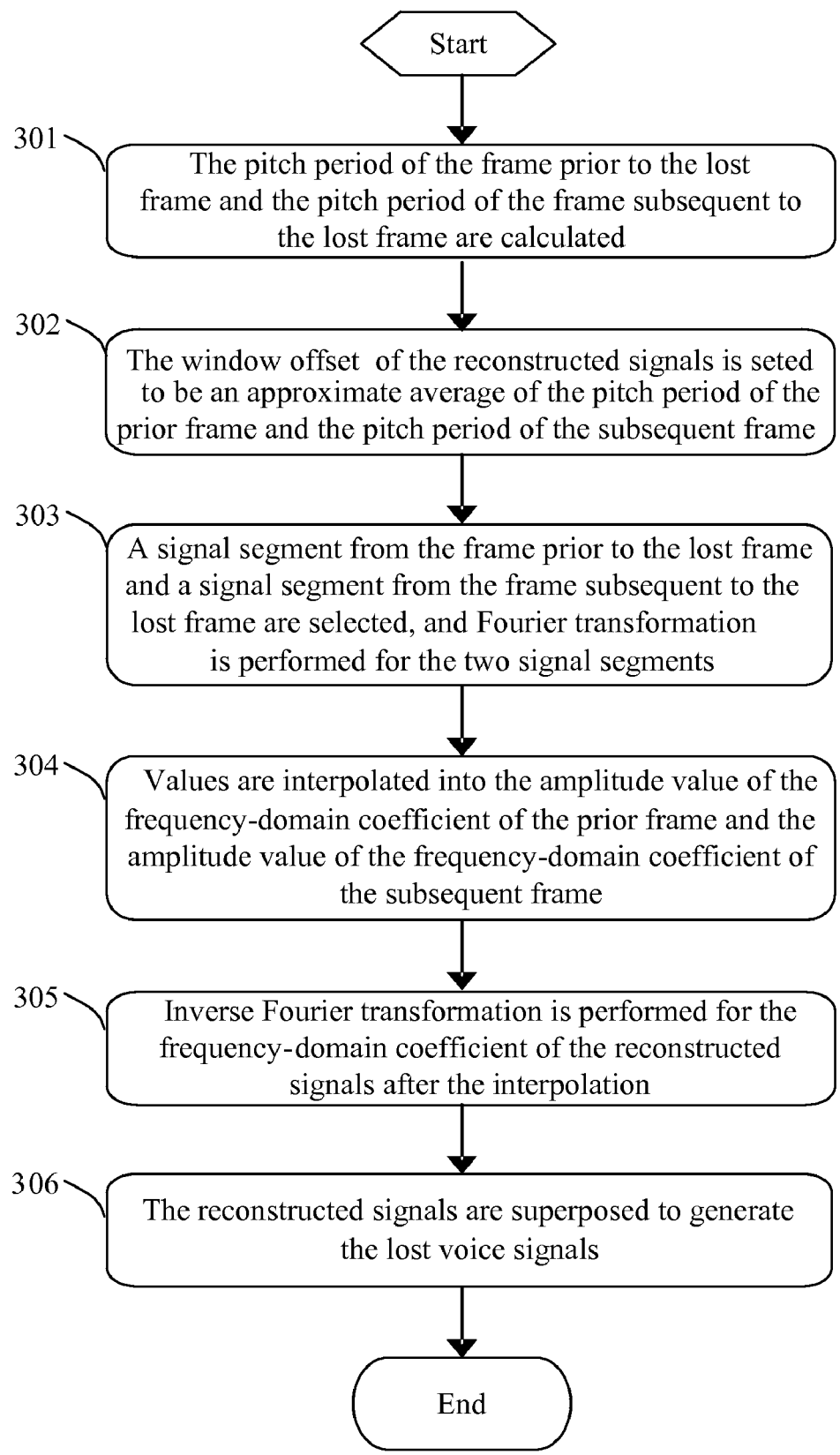
FIG. 3 is a flowchart of reconstructing voice frames in a first embodiment of the present invention.
Figure 4:
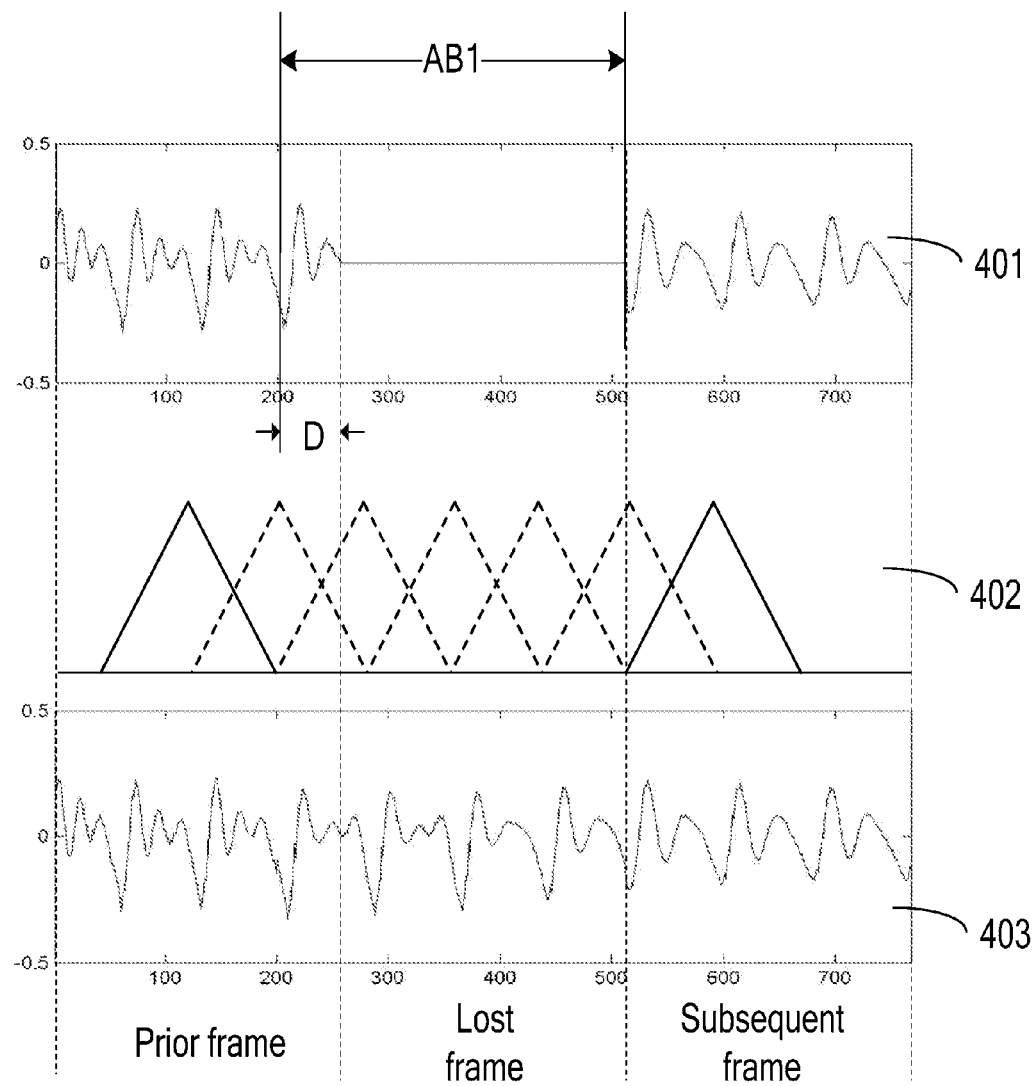
FIG. 4 is a waveform of reconstructed voice frames in the first embodiment of the present invention.

FIG. 3 is a flowchart of reconstructing voice frames in the first embodiment of the present invention, which includes the following blocks:

Block 301: The pitch period of the time-domain signal in the frame prior to the lost frame and the pitch period of the time-domain signal in the frame subsequent to the lost frame are calculated, and the pitch period length of the time-domain signal of the prior frame is recorded as TP and the pitch period length of the time-domain signal of the subsequent frame is recorded as TN.

The pitch period may be calculated in many ways such as auto-correlation, which is not detailed herein.

Block 302: The window offset (S) of the Fourier transformation window is set according to the pitch period (TP) of the time-domain signal of the prior frame and the pitch period (TN) of the time-domain signal of the subsequent frame. The window offset (S) may be set to be TP or TN, or an approximate average of the pitch period of the time-domain signal of the prior frame and the pitch period of the time-domain signal of the subsequent frame. Preferably, it is set that $S=\text{fix}((TP+TN)/2)$ in this embodiment, where fix refers to rounding off to an integer.

Block 303: A signal segment is selected from the frame prior to the lost frame, a signal segment is selected from the frame subsequent to the lost frame, and Fourier transformation is performed for the two signal segments. The segment length depends on the window length (L) of the added analysis window. The added analysis window may be a rectangular window or a triangular window. The window length is not less than 2 s, and may be 2 s, 4 s, and so on. Preferably, the analysis window is a triangular window, and the window length (L) is $S*2$. If the end position of the time-domain signal in the frame prior to the lost frame is set be sPos, then the start position of the Fourier transformation window of the prior frame is:

$$sPos-D-L \quad [11]$$

the start position of the Fourier transformation window of the subsequent frame is:

$$sPos-D+S\times pitchNum \quad [12]$$

In formulas (11) and (12), D is the phase difference between the time-domain signal of the prior frame and the time-domain signal of the subsequent frame. A method for calculating the phase difference is described below:

The last TP sample points in the prior frame are selected as sample points to form a matching window. TP is a pitch period length of the prior frame (with the sampling ratio being constant, the quantity of sample points is in proportion with the pitch period, and therefore, the pitch period may be used to express the quantity of sample points).

Several sample points at the head of the subsequent frame are selected to form a template. The quantity of sample points in the template is less than that in the matching window.

The template slides from point to point in the range of the matching window, the corresponding sample point in each position is matched and compared, and at the position with the highest similarity of the corresponding sample points, the distance between the sample point in the matching window corresponding to the first sample point in the template and the last sample point in the matching window is determined, and this distance is used as the phase distance (D). The matching and comparison may be based on the sum of the absolute values of the amplitude differences, namely, the sum of the absolute values of the amplitude differences between the sample points in the template and the corresponding sample points in the matching window. When the sum reaches the minimum value, the current position is the position where the phase of the prior frame is the most similar to the phase of the subsequent frame. An exemplary process of calculating the phase difference is described below:

Three sample points B1-B3 are selected from the subsequent frame to form a template, and the last five sample points A1-A5 (five sample points exist in a pitch period of the time-domain signal of the prior frame) are selected from the prior frame to form a matching window. The template slides from sample point to sample point within the range of the matching window, and calculation is performed to obtain the sum of the absolute values of the amplitude differences between the sample points in the template and the corresponding sample points in the matching window at each position. If the sum of the absolute values of the amplitude differences between the sample points in the template and the corresponding sample points in the matching window at position 2 (namely, the position where B1-B3 correspond to A2-A4) is the minimum, it indicates that the phase of the template is the most similar to the phase of the matching window at this position. Therefore, the distance between A2 and A5 in the matching window corresponding to B1 in the template at position 2 is the phase difference between the matching window and the template (namely, between the pitch period of the time-domain signal of the prior frame and the pitch period of the time-domain signal of the subsequent frame).

In the method for calculating the phase difference, sample points at a distance of one or more TNs behind the start position of the time-domain signal of the subsequent frame may be selected to form a template; or sample points of one pitch period length at a distance of one or more TPs before the end position of the time-domain signal of the prior frame may be selected to form a matching window.

In formula (12), pitchNum is the quantity of the pitch periods of the reconstructed signals. As shown in FIG. 4, the interval AB1 represents the length of the reconstructed signals, and the quantity of the pitch periods of the reconstructed signals corresponding to the interval AB1 is pitchNum. The length of the interval AB1 is the sum of the total length of the lost frames and the phase difference (D). If the pitch period of the reconstructed signals set to be the approximate average of the sum of the pitch period of the prior frame and the pitch period of the subsequent frame, then pitchNum is:

$$pitchNum = \frac{(D + N \times lostNum) \times 2}{TP + TN} \quad [13]$$

In formula (13), N is the frame length, and lostNum is the quantity of the lost frames.

Block 304: Values are interpolated into the amplitude value of the frequency-domain coefficient of the prior frame and the amplitude value of the frequency-domain coefficient of the subsequent frame to obtain the amplitude value of the frequency-domain coefficient of the reconstructed signals. The formula is:

$$A_{p,k} = A_{n1,k} + (A_{n2,k} - A_{n1,k}) \cdot \frac{p}{PP+1} \quad [14]$$

In formula (14), $A_{p,k}$ is the amplitude value of the frequency-domain coefficient of a reconstructed signal obtained after interpolation; the range of p is 1, 2, . . . , PP; and PP is the quantity of interpolated values (namely, the quantity of the reconstructed signals), which may be calculated through the following formula:

$$PP = (lostNum+1) \cdot N/S - 1 \quad [15]$$

In formula (15), S is the window offset, and lostNum is the quantity of lost frames.

Block 305: Inverse Fourier transformation is performed for the frequency-domain coefficient of the reconstructed signals after the interpolation, thus generating the reconstructed signals, which may be calculated through the following formula:

$$y_p(n) = \frac{1}{N} \sum_{k=0}^{N-1} X(p,k) \cdot e^{j\frac{2\pi}{N}kn} \quad [16]$$

In formula (16), $y_p(n)$ is a signal after inverse transformation; the value range of n is 0, 1, . . . , N−1; X(p,k) is the frequency-domain coefficient of a reconstructed signal after the interpolation, and may be calculated through the following formula:

$$X(p,k) = A_{p,k} e^{j\theta_{n1,k}} \quad [17]$$

In formula (17), the amplitude value of the frequency-domain coefficient is the amplitude value generated in block 304; and the phase is the phase of the frequency-domain coefficient after the time-domain signal of the prior frame undergoes the Fourier transformation, or the phase of the frequency-domain coefficient after the time-domain signal of the subsequent frame undergoes the Fourier transformation. Alternatively, the frequency-domain coefficient of a reconstructed signal is divided into two parts; the first part is the phase of the frequency-domain coefficient of the prior frame, and the last part is the phase of the frequency-domain coefficient of the subsequent frame.

Block 306: The reconstructed signals are superposed to generate the lost voice signals.

The superposition of the reconstructed signals is performed through formula (9), where the window offset (S) is the S value set in block 302.

Figure 1:
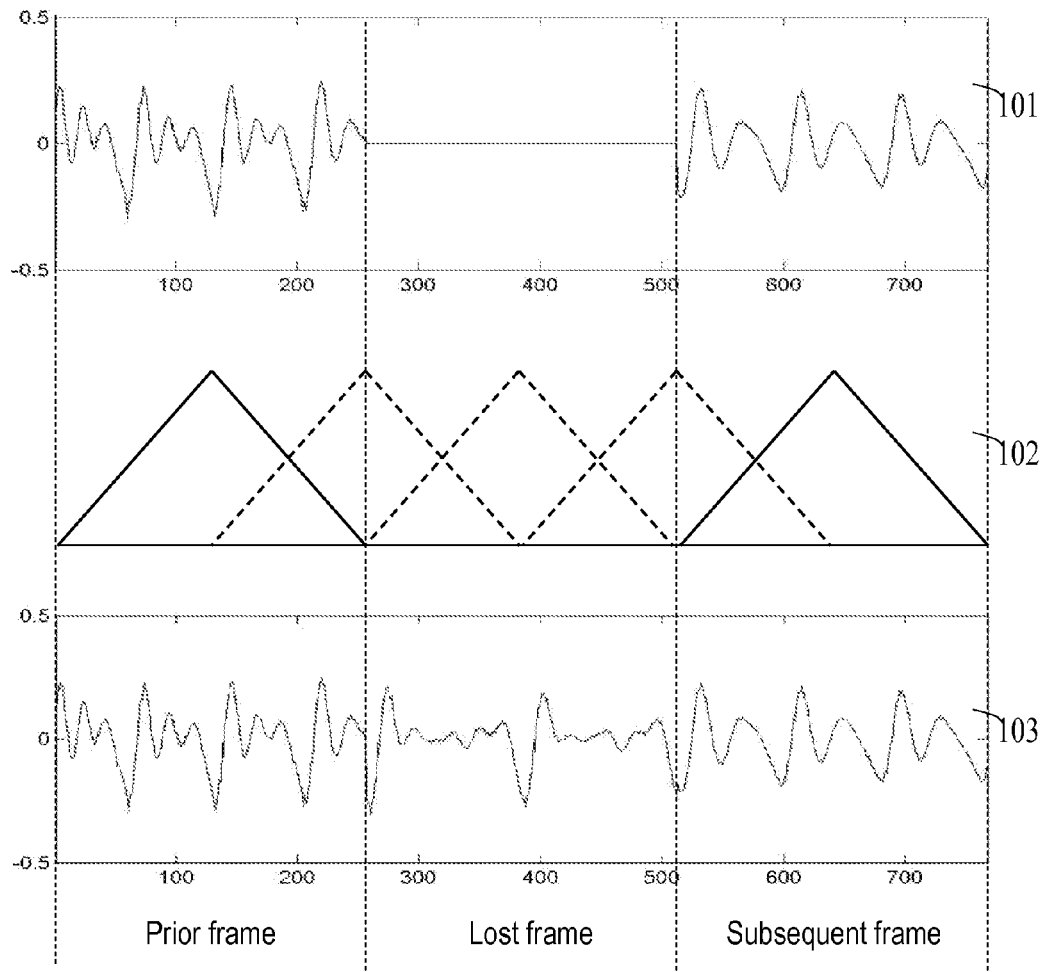
FIG. 1 shows a waveform of reconstructed voice frames in the prior art.
Figure 2:
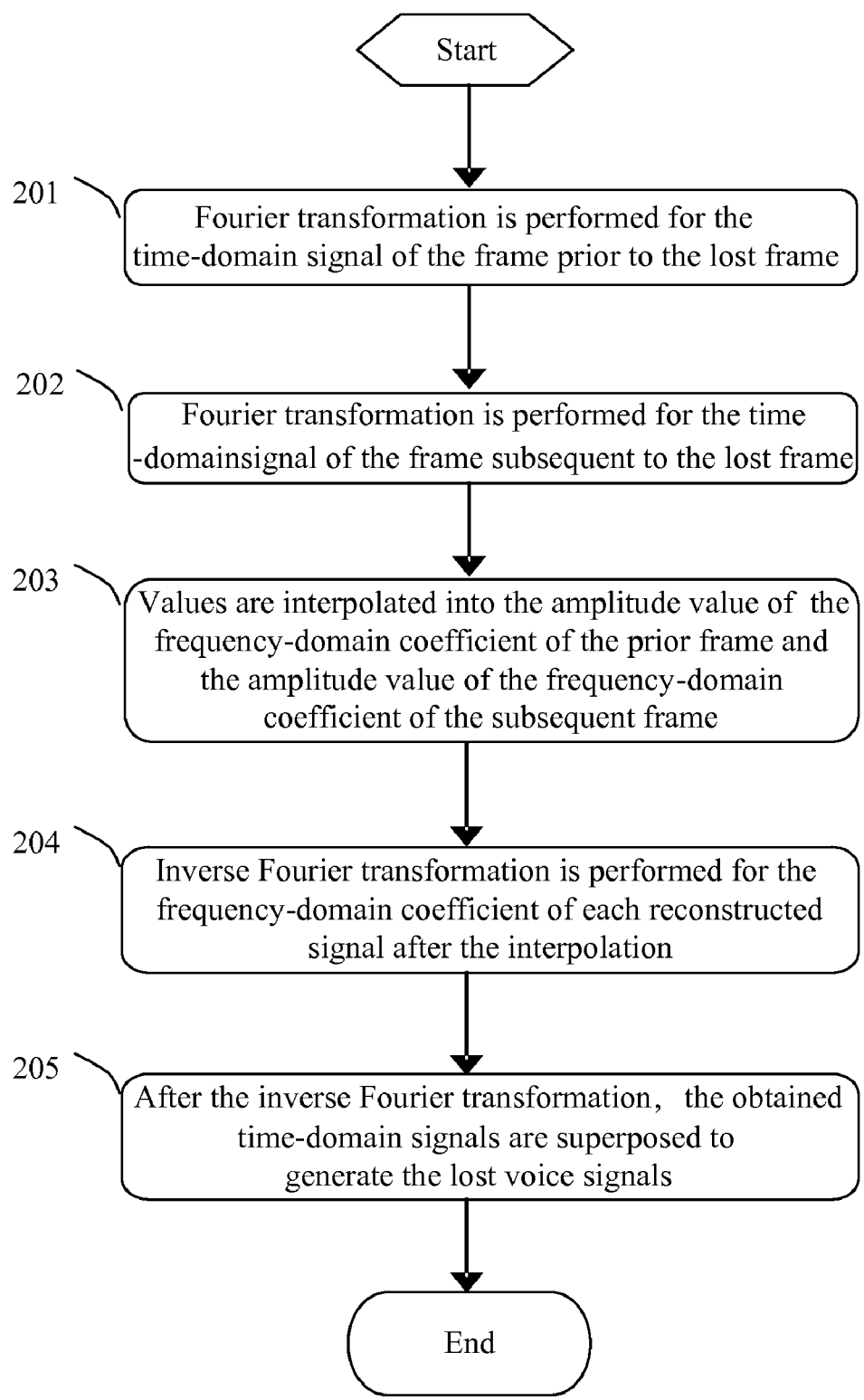
FIG. 2 is a flowchart of reconstructing voice frames in the prior art.

FIG. 4 shows the waveform of signals of lost frames reconstructed according to the foregoing process. The waveform 401 in FIG. 4 is the same as the waveform 101 in FIG. 1. The first solid line window in the waveform 402 is a Fourier transformation window added for the time-domain signal of the prior frame; the second solid line window is a Fourier transformation window added for the time-domain signal of the subsequent frame; the dotted line window is a transformation window added at the time of signal reconstruction; and the waveform 403 is the waveform of a reconstructed signal.

It can be seen from the above description that, on one hand, window offset S=(TP+TN)/2 (this value is also the pitch period of the reconstructed signal) is set, and the window length is set to be 2 s. Therefore, the window offset is the closest to the pitch period length of the actual signal, and the pitch period of the reconstructed signal is the closest to that of the actual signal. On the other hand, the position of the Fourier transformation window of the prior frame and the subsequent frame is set according to the phase difference between the pitch period of the time-domain signal of the prior frame and the pitch period of the time-domain signal of the subsequent frame. Therefore, the frequency-domain coefficient obtained after the prior frame and the subsequent frame undergo the Fourier transformation is close to the phase of the actual signal; the phase of the reconstructed signal matches that of the actual signal; and the inaccuracy of the pitch period and the out-of-sync of the phase are avoided.

In order to make the pitch period of the reconstructed signal take on a gradient trend and make it more proximate to the regularity of the pitch period of the actual voice, and in order to further improve the matching precision of the phase between the reconstructed signal and the actual signal, another solution is put forward in the second embodiment of the present invention based on the process shown in FIG. 3. The implementation process of this solution is shown in FIG. 5, and the corresponding waveform is shown in FIG. 6.

Figure 5:
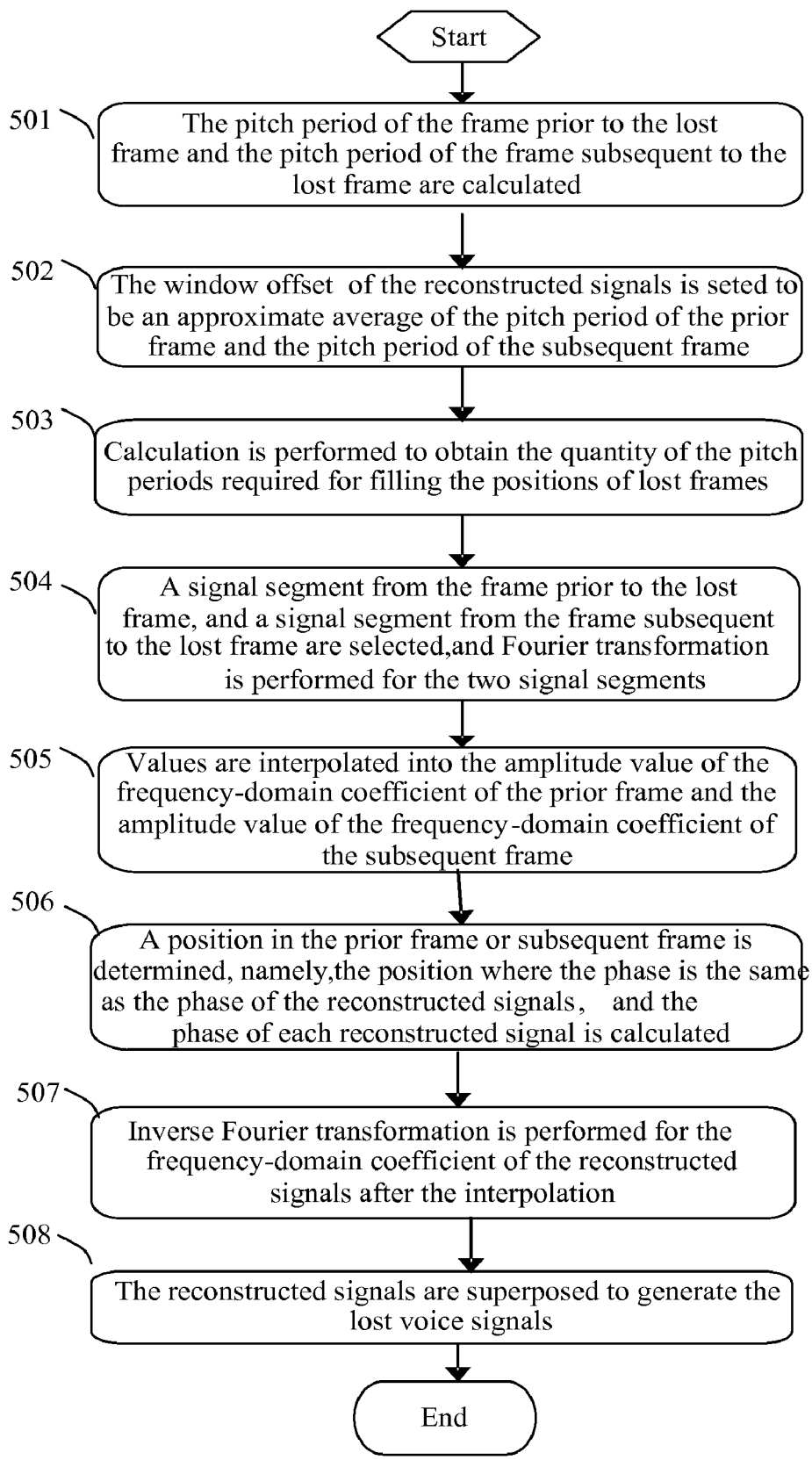
FIG. 5 is a flowchart of reconstructing voice frames in a second embodiment of the present invention.
Figure 6:
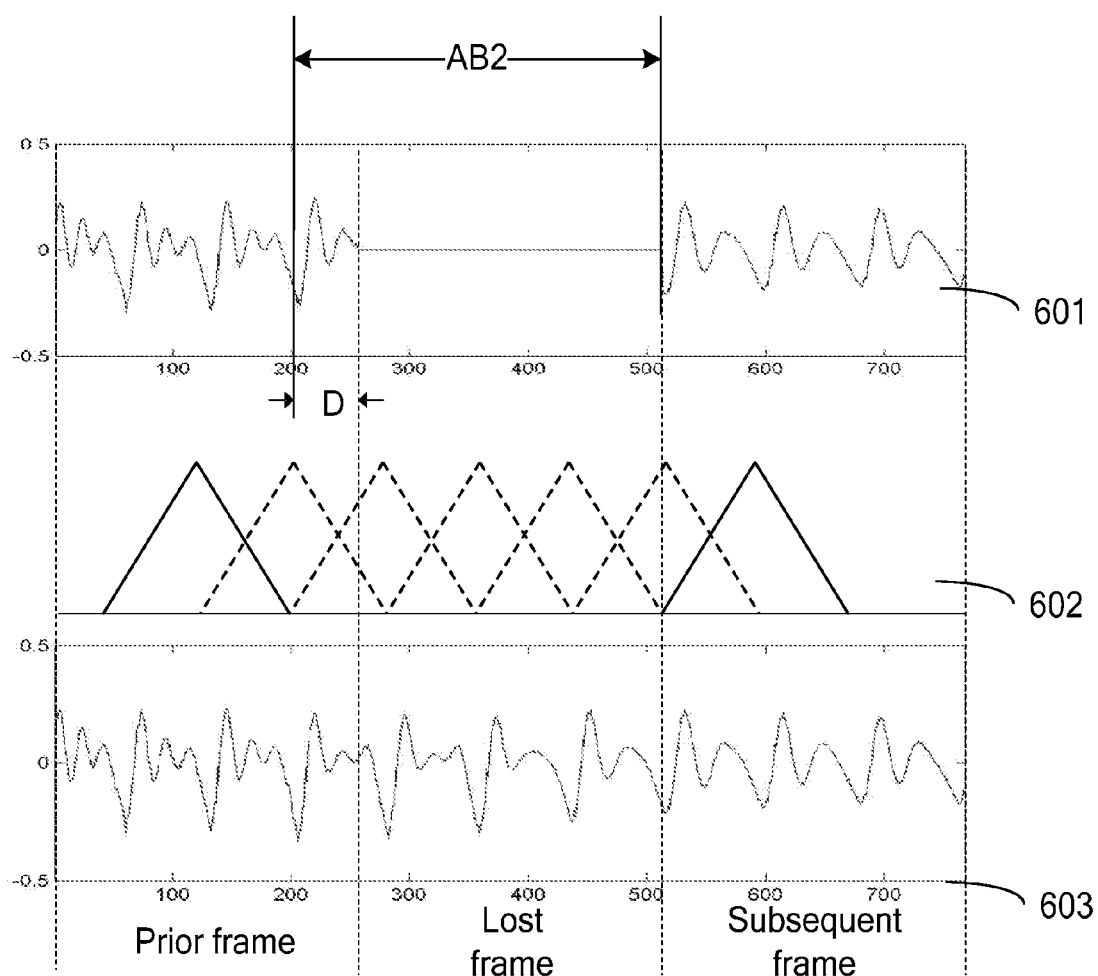
FIG. 6 is a waveform of reconstructed voice frames in the second embodiment of the present invention.

FIG. 5 is a flowchart of reconstructing voice frames in a further aspect of the present invention, which includes the following blocks:

Block 501: The pitch period of the time-domain signal in the frame prior to the lost frame and the pitch period of the time-domain signal in the frame subsequent to the lost frame are calculated, the pitch period length of the time-domain signal of the prior frame is recorded as TP, and the pitch period length of the time-domain signal of the subsequent frame is recorded as TN.

Block 502: The window offset (S) of the reconstructed signal is set to be approximately the average of the pitch period of the time-domain signal of the prior frame and the pitch period of the time-domain signal of the subsequent frame. Preferably, it is set that S=fix((TP+TN)/2) in this embodiment, where fix refers to rounding off to an integer.

Block 503: Calculation is perform to obtain the quantity of the pitch periods required for filling the positions of lost frames (namely, the quantity of the pitch periods of the reconstructed signals), and the pitch period lengths are set respectively.

As shown in FIG. 6, the interval AB2 represents the length of the reconstructed signals, and the quantity of the pitch periods of the reconstructed signals corresponding to the interval AB2 is pitchNum. The length of the interval AB2 is the sum of the total length of the lost frames and the phase difference (D). If the pitch period of the reconstructed signals is set to be the approximate average of the sum of the pitch period of the prior frame and the pitch period of the subsequent frame, then a formula of calculating pitchNum is:

$$pitchNum = \frac{(D + N * lostNum) * 2}{TP + TN} \quad [18]$$

In formula (18), N is the frame length; lostNum is the quantity of lost frames; and D is the phase difference between the prior frame and the subsequent frame. The method for calculating the phase difference (D) is described in block 303 in the first embodiment above.

The length of the pitch period required for filling the positions of the lost frames is:

$$pitchLen(k)=TP+(TN-TP)/(pitchNum+1)*k \quad [19]$$

In formula (19), pitchLen(k) is the length of the $k^{th}$ pitch period which serves as a filler, where k is in a range of 1, 2, ..., pitchNum. Formula (19) enables the pitch period to take on a gradient trend. That is, the pitch period of the reconstructed signal approaches from the approximate value of the pitch period of the prior frame signal to the pitch period of the subsequent frame signal gradually, and never equals the pitch period of the subsequent frame signal.

Formula (19) reveals that the incremental value (TN−TP)/(pitchNum+1)*k accomplishes the gradient of the pitch period. Other incremental values may be set to accomplish the gradient of the pitch period.

After the length of the pitch period serving as a filler is set, the length of the pitch period needs to be adjusted. The total length of the pitch periods serving as actual fillers is fillLen=D+N×lostNum. If the total length of the pitch periods set above is less than fillLen, an incremental value (such as 1) is added to each pitch period length set above until the sum of the pitch periods is equal to fillLen. If the total length of the pitch periods set above is greater than fillLen, an incremental value (such as 1) is subtracted from each pitch period length set above until the sum of the pitch periods is equal to fillLen.

Block 504: A signal segment is selected from the time-domain signal of the frame prior to the lost frame, a signal segment from the time-domain signal of the frame subsequent to the lost frame, and Fourier transformation is performed for the two signal segments. The segment length depends on the window length (L) of the added analysis window. Preferably, the analysis window is a triangular window, and the window length (L) is S*2. If the end position of the time-domain signal in the frame prior to the lost frame is set be sPos, then the start position of the Fourier transformation window of the prior frame is:

$$sPos-D-L \quad [20]$$

and the start position of the Fourier transformation window of the subsequent frame is:

$$sPos-D+S*pitchNum \quad [21]$$

Block 505: Values are interpolated into the amplitude value of the frequency-domain coefficient of the prior frame and the amplitude value of the frequency-domain coefficient of the subsequent frame to obtain the amplitude value of the frequency-domain coefficient of the reconstructed signals. The method for interpolation is described in block 304 in the first embodiment above.

Block 506: A position in the time-domain signal of the prior frame or the time-domain signal of the subsequent frame is determined, namely, the position where the phase is the same as or the most similar to the phase of the reconstructed signals, and the frequency-domain phase of each reconstructed signal is calculated according to the determined position. The calculation method may be as follows:

There are pitchNum+1 reconstructed signals in total, where pitchNum is the quantity of the pitch periods required as fillers, namely, the quantity of the periods of the reconstructed signals. The quantity of the pitch periods between the Fourier transformation window of the prior frame and the Fourier transformation window of the subsequent frame is pitchNum+2 (namely, the difference between the start position of the Fourier transformation window of the prior frame and the start position of the Fourier transformation window of the subsequent frame). Therefore, ptichLen is filled with two pitch periods in this way: ptichLen(0) is set to be the pitch period of the time-domain signal of the prior frame, and ptichLen(PitchNum+1) is set to be the pitch period of the time-domain signal of the subsequent frame.

For the first part of the reconstructed signals (whose sequence number is k1=1, 2, ..., fix((pitchNum+1)/2)), the frequency-domain phase is calculated in the following way:

(1) Calculation is performed to obtain the sum of the pitch periods of the first to $k1^{th}$ reconstructed signals:

$$pitchAll = \sum_{j=0}^{k1-1} pitchLen(j) \quad [22]$$

(2) A position is calculated in the prior frame, namely, the position where the phase is the same as or the most similar to the phase of the $K1^{th}$ reconstructed signal:

$$sPos-D-L+S*k1-pitchAll \quad [23]$$

(3) Fourier transformation is performed for the voice segment that starts from sPos−D−L+S*k1−ptichAll and is with a length of L in the time-domain signal of the prior frame. After the Fourier transformation, the phase of the frequency-domain coefficient is used as the phase of the $k1^{th}$ reconstructed signal. Evidently, the start position for performing the Fourier transformation for the time-domain signal of the prior frame here is apart from the start position of the Fourier transformation window of the prior frame by one incremental distance. The incremental distance is S*k1−pitchAll.

For the last part of the reconstructed signals (whose sequence number is k2=fix((pitchNum+1)/2+1, ..., pitchNum+1), the frequency-domain phase is calculated in the following way:

(1) Calculation is performed to obtain the sum of the pitch periods of the reconstructed signals from the $k2^{th}$ reconstructed signal to the last reconstructed signal:

$$pitchAll = \sum_{j=k2}^{pitchNum+1} pitchLen(j) \quad [24]$$

(2) A position in the time-domain signal of the subsequent frame, namely, the position where the phase is the same as or the most similar to the phase of the $k2^{th}$ reconstructed signal, is calculated:

sPos−D+S×pitchNum−S×(pitchNum−k2)+pitchAll  [25]

(3) Fourier transformation is performed for the voice segment that starts from sPos−D+S×pitchNum−S×(pitchNum−k2)+ptichAll and is with a length of L(L=2 s) in the time-domain signal of the subsequent frame. After the Fourier transformation, the phase of the frequency-domain coefficient is used as the frequency-domain phase of the $k2^{th}$ reconstructed signal. Evidently, the start position for performing the Fourier transformation for the time-domain signal of the subsequent frame here is apart from the start position of the Fourier transformation window of the subsequent frame by one incremental distance. The incremental distance is pitchAll−S×(pitchNum−k2).

In this block, the reconstructed signals are divided into two parts which are almost equal. In practice, the reconstructed signals may be divided in other ways; for example, the first part of the reconstructed signals is more than the last part of the reconstructed signals. Alternatively, in practice, the reconstructed signals are not divided into two parts, but a phase similar to the phase of each reconstructed signal is searched out in the prior frame or the subsequent frame through calculation. The method for calculating and searching for the phase similar to the phase of each reconstructed signal in the prior frame is the same as the method for calculating and searching for the phase similar to the phase of the first part of the reconstructed signals in the prior frame; and the method for calculating and searching for the phase similar to the phase of each reconstructed signal in the subsequent frame is the same as the method for calculating and searching for the phase similar to the phase of the last part of the reconstructed signals in the subsequent frame.

Block 507: Inverse Fourier transformation is performed for the frequency-domain coefficient of the reconstructed signals after the interpolation, thus generating the time-domain signals of the reconstructed signals. In the inverse Fourier transformation, the amplitude value of the frequency-domain coefficient is the amplitude value generated in block 505, and the phase is the phase calculated out in block 506.

Block 508: The reconstructed signals are superposed to generate the lost voice signals.

The superposition of the reconstructed signals is performed through formula (9), where the window offset (S) is the S value set in block 502.

FIG. 6 shows the waveform of signals of lost frames reconstructed according to the foregoing process. The waveform 601 in FIG. 6 is the same as the waveform 101 in FIG. 1. The waveform 602 is the added Fourier transformation window. The first solid line window is a transformation window added for the prior frame signal; the second solid line window is a transformation window added for the subsequent frame signal; the dotted line window is a transformation window added at the time of signal reconstruction; and the waveform 603 is the waveform of a reconstructed signal.

It can be seen from the above description that, in this embodiment, a gradient is set for the pitch periods of the reconstructed signals on the basis of the preceding embodiment. Therefore, the pitch periods of the reconstructed signals approach from the pitch period of the prior frame signal to the pitch period of the subsequent frame signal gradually. Meanwhile, for each reconstructed signal, the position with the same or the most similar phase is found in the time-domain signal of the prior frame and the time-domain signal of the subsequent frame. With this position as the start position of the Fourier transformation window, Fourier transformation is performed to obtain the frequency-domain phase of the corresponding reconstructed signal. This frequency-domain phase is applied in the inverse Fourier transformation of the reconstructed signal. As a result, more precise matching is accomplished at the junction between the lost frame signal and the subsequent frame signal. Moreover, the pitch periods of the filler signals take on a gradient trend, and therefore, the filler signals are more approximate to the actual signals.

A system for hiding lost packets is disclosed in an embodiment of the present invention. The structure of the system is shown in FIG. 7.

Figure 7:
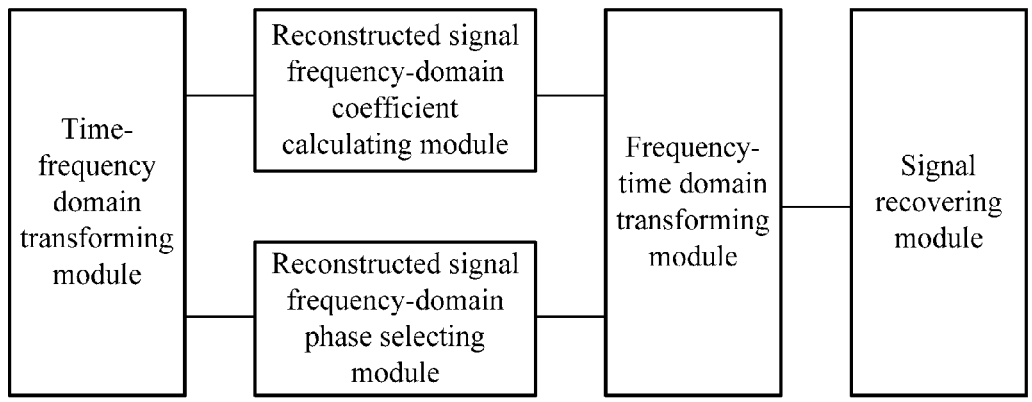
FIG. 7 shows a first structure of a system for hiding lost packets in an embodiment of the present invention.

FIG. 7 shows a structure of a system for hiding lost packets in an embodiment of the present invention. The system includes: a time-frequency domain transforming module, a reconstructed signal frequency-domain coefficient calculating module, a reconstructed signal frequency-domain phase selecting module, a frequency-time domain transforming module, and a signal recovering module.

The time-frequency domain transforming module is adapted to: transform a time domain signal segment from a time domain to a frequency domain to obtain a frequency-domain coefficient of the prior frame and a frequency-domain coefficient of the subsequent frame. The time-frequency domain transforming module may be a Fourier transforming module, where the time-domain signal segment is obtained from a frame prior to a lost signal and a frame subsequent to the lost signal respectively according to periodicity of pitch and phase of the signal, and perform.

The reconstructed signal frequency-domain coefficient calculating module is adapted to: interpolate values into an amplitude value of the frequency-domain coefficient of the prior frame and an amplitude value of the frequency-domain coefficient of the subsequent frame calculated by the time-frequency domain transforming module to obtain the amplitude value of the frequency-domain coefficient of multiple reconstructed signals.

The reconstructed signal frequency-domain phase selecting module is adapted to: select a phase most similar to the phase of the reconstructed signals from the prior frame and/or the subsequent frame as a phase value of the frequency-domain coefficient of the reconstructed signals.

The frequency-time domain transforming module is adapted to: transform the reconstructed signals from the frequency domain to the time domain to obtain time-domain signals of the reconstructed signals according to the amplitude value of the frequency-domain coefficient of the reconstructed signals calculated out by the reconstructed signal frequency-domain coefficient calculating module and according to the phase value selected by the reconstructed signal frequency-domain phase selecting module. The frequency-time domain transforming module may be an inverse Fourier transforming module.

The signal recovering module is adapted to superpose the time-domain signals of the reconstructed signals to recover the lost signal, where the time-domain signals are obtained as a result of processing by the frequency-time domain transforming module.

The time-frequency domain transforming module in the foregoing system includes: a phase difference obtaining submodule, a pitch period obtaining submodule, a length determining submodule, and a position determining submodule.

The phase difference obtaining submodule is adapted to obtain the phase difference between the prior frame and the subsequent frame.

The pitch period obtaining submodule is adapted to obtain the pitch period length of the prior frame and/or the subsequent frame.

The length determining submodule is adapted to: determine the length of the time-domain signals obtained from the prior frame and the subsequent frame (namely, the length of the Fourier transformation window) according to the obtained pitch period length, where the determined length is at least twice the approximate average of the sum of the pitch period of the prior frame and the pitch period of the subsequent frame, or at least twice the pitch period of the prior frame, or at least twice the pitch period of the subsequent frame.

The position determining submodule is adapted to determine the position of the time-domain signals obtained from the prior frame and the subsequent frame (namely, the position of the Fourier transformation window) according to the obtained phase difference, where: the start position of the time-domain signal obtained from the prior frame is the position obtained by moving forward from the end position of the time-domain signal of the prior frame for a length of the foregoing phase difference and then moving forward for a length of the time-domain signal, and the start position of the time-domain signal obtained from the subsequent frame is the position obtained by moving forward from the end position of the time-domain signal of the prior frame for a length of the foregoing phase difference and then moving backward for the total length of the reconstructed signals.

The reconstructed signal frequency-domain phase selecting module in the foregoing system is in two types of structures. A type of structure includes a selecting submodule, which is adapted to select the phase of the frequency-domain coefficient of the prior frame or the frequency-domain coefficient of the subsequent frame as the phase of the frequency-domain coefficient of the reconstructed signals. The other type of structure includes a dividing submodule and a selecting submodule. The dividing submodule is adapted to divide the frequency-domain coefficients of the reconstructed signals into two parts, namely, a first part and a last part. The selecting submodule is adapted to: select the phase of the frequency-domain coefficient of the prior frame for the first part of the frequency-domain coefficients of the reconstructed signals, and select the phase of the frequency-domain coefficient of the subsequent frame for the last part of the frequency-domain coefficients of the reconstructed signals.

A system for hiding lost packets is disclosed in another embodiment of the present invention. The structure of the system is shown in FIG. 8.

Figure 8:
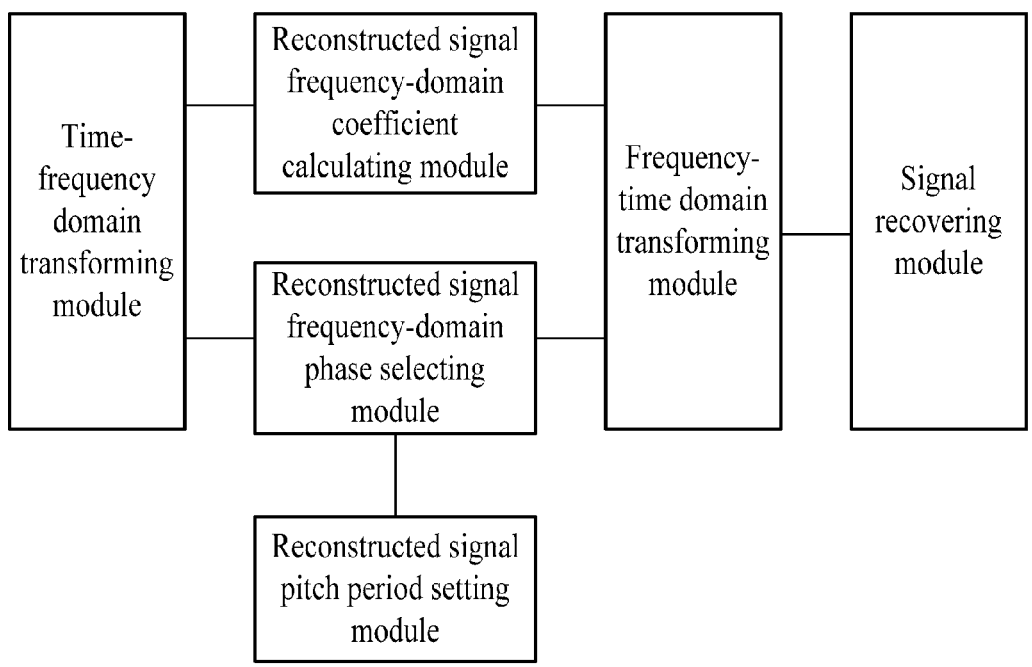
FIG. 8 shows a second structure of a system for hiding lost packets in an embodiment of the present invention.

FIG. 8 shows a structure of a system for hiding lost packets in an embodiment of the present invention. The system includes: a time-frequency domain transforming module, a reconstructed signal frequency-domain coefficient calculating module, a reconstructed signal frequency-domain phase selecting module, a reconstructed signal pitch period setting module, a frequency-time domain transforming module, and a signal recovering module.

The time-frequency domain transforming module is adapted to: transform a time domain signal segment from a time domain to a frequency domain to obtain a frequency-domain coefficient of the prior frame and a frequency-domain coefficient of the subsequent frame. The time-frequency domain transforming module may be a Fourier transforming module, where the time-domain signal segment is obtained from a frame prior to a lost signal and a frame subsequent to the lost signal respectively according to periodicity of pitch and phase of the signal, and perform.

The reconstructed signal pitch period setting module is adapted to set the pitch period of each reconstructed signal, where the set pitch periods of the reconstructed signals approach from the pitch period of the prior frame to the pitch period of the subsequent frame gradually.

The reconstructed signal frequency-domain coefficient calculating module is adapted to: interpolate values into an amplitude value of the frequency-domain coefficient of the prior frame and an amplitude value of the frequency-domain coefficient of the subsequent frame calculated by the time-frequency domain transforming module to obtain the amplitude value of the frequency-domain coefficient of multiple reconstructed signals.

The reconstructed signal frequency-domain phase selecting module is adapted to: select a phase most similar to the phase of the reconstructed signals from the prior frame and/or the subsequent frame as a phase value of the frequency-domain coefficient of the reconstructed signals.

The frequency-time domain transforming module is adapted to: transform the reconstructed signals from the frequency domain to the time domain to obtain time-domain signals of the reconstructed signals according to the amplitude value of the frequency-domain coefficient of the reconstructed signals calculated out by the reconstructed signal frequency-domain coefficient calculating module and according to the phase value selected by the reconstructed signal frequency-domain phase selecting module. The frequency-time domain transforming module may be an inverse Fourier transforming module.

The signal recovering module is adapted to superpose the time-domain signals of the reconstructed signals to recover the lost signal, where the time-domain signals are obtained as a result of processing by the frequency-time domain transforming module.

The time-frequency domain transforming module in the foregoing system includes: a phase difference obtaining submodule, a pitch period obtaining submodule, a length determining submodule, and a position determining submodule.

The phase difference obtaining submodule is adapted to obtain the phase difference between the prior frame and the subsequent frame.

The pitch period obtaining submodule is adapted to obtain the pitch period length of the prior frame and/or the subsequent frame.

The length determining submodule is adapted to: determine the length of the time-domain signals obtained from the prior frame and the subsequent frame (namely, the length of the Fourier transformation window) according to the obtained pitch period length, where the determined length is at least twice the approximate average of the sum of the pitch period of the prior frame and the pitch period of the subsequent frame, or at least twice the pitch period of the prior frame, or at least twice the pitch period of the subsequent frame.

The position determining submodule is adapted to determine the position of the time-domain signals obtained from the prior frame and the subsequent frame (namely, the position of the Fourier transformation window) according to the obtained phase difference, where: the start position of the time-domain signal obtained from the prior frame is the position obtained by moving forward from the end position of the time-domain signal of the prior frame for a length of the foregoing phase difference and then moving forward for the length of the time-domain signal, and the start position of the time-domain signal obtained from the subsequent frame is the position obtained by moving forward from the end position of the time-domain signal of the prior frame for a length of the foregoing phase difference and then moving backward for a total length of the reconstructed signals.

The reconstructed signal pitch period setting module in the foregoing system further includes a first adjusting submodule and/or a second adjusting submodule.

The first adjusting submodule is adapted to: when the total length of the set pitch periods of the reconstructed signals is less than the total length of the actually required pitch periods of the reconstructed signals, adjust the set pitch period length of each reconstructed signal to increase the pitch period length until the two total lengths are equal. The second adjusting submodule is adapted to: when the total length of the set pitch periods of the reconstructed signals is greater than the total length of the actually required pitch periods of the reconstructed signals, adjust the set pitch period length of each reconstructed signal to decrease the pitch period length until the two total lengths are equal.

The reconstructed signal frequency-domain phase selecting module in the foregoing system may further include a first selecting submodule, or include a second dividing submodule and a second selecting submodule.

When the reconstructed signal frequency-domain phase selecting module includes the first selecting submodule, the first selecting submodule is adapted to: select the position with a phase similar to the phase of the frequency-domain coefficient of each reconstructed signal from the time-domain signal of the prior frame according to the pitch period set for the reconstructed signal, calculate the frequency-domain phase of the time-domain signal of the prior frame in this position, and use the calculated frequency-domain phase as the frequency-domain phase corresponding to the frequency-domain coefficient of the reconstructed signal; or adapted to: select the position with a phase similar to the phase of the frequency-domain coefficient of each reconstructed signal from the time-domain signal of the subsequent frame according to the pitch period set for the reconstructed signal, calculate the frequency-domain phase of the time-domain signal of the subsequent frame in this position, and use the calculated frequency-domain phase as the frequency-domain phase corresponding to the frequency-domain coefficient of the reconstructed signal.

In practice, when calculating the frequency-domain phase corresponding to the frequency-domain coefficient of each reconstructed signal in the prior frame, the first selecting submodule performs the following operations for the $k1^{th}$ reconstructed signal:

(1) Performing calculation to obtain the total length of the pitch periods (pitchAll1) of the first to $k1^{th}$ reconstructed signals.

(2) Obtaining the position with a similar phase by moving from the start position of the time-domain signal selected in the prior frame for a length of the offset "S*k1−pitchAll1", where: S is a set window offset, and is an approximate average of the sum of the pitch period of the prior frame and the pitch period of the subsequent frame, or the pitch period of the prior frame, or the pitch period of the subsequent frame; when the difference between the start position of the time-domain signal selected in the prior frame and the position with a similar phase is positive, moving backward from the start position for a length of the offset; and, when the difference is negative, moving forward from the start position for a length of the offset.

(3) Performing transformation from the time domain to the frequency domain for the time-domain signal of the prior frame, starting from the position with a similar phase, and using the obtained phase of the frequency-domain coefficient as the frequency-domain phase corresponding to the frequency-domain coefficient of the $k1^{th}$ reconstructed signal.

When calculating the frequency-domain phase corresponding to the frequency-domain coefficient of each reconstructed signal in the subsequent frame, the first selecting submodule performs the following operations for the $k2^{th}$ reconstructed signal:

(1) Performing calculation to obtain the total length of the pitch periods (pitchAll2) of the reconstructed signals from the $k2^{th}$ reconstructed signal to the last reconstructed signal.

(2) Obtaining the position with a similar phase by moving from the start position of the time-domain signal selected in the subsequent frame for a length of the offset "pitchAll2−S* (pitchNum−k2)", where: S is a set window offset, and pitchNum is the quantity of periods of the reconstructed signals; when the difference between the start position of the time-domain signal selected in the subsequent frame and the position with a similar phase is positive, moving backward from the start position for a length of the offset; and, when the difference is negative, moving forward from the start position for a length of the offset.

(3) Performing transformation from the time domain to the frequency domain for the time-domain signal of the subsequent frame, starting from the position with a similar phase, and using the obtained phase of the frequency-domain coefficient as the frequency-domain phase corresponding to the frequency-domain coefficient of the $k2^{th}$ reconstructed signal.

When the reconstructed signal frequency-domain phase selecting module includes the second dividing submodule and the second selecting submodule, the second dividing submodule is adapted to divide the frequency-domain coefficients of the reconstructed signals into two parts, namely, a first part and a last part; the second selecting submodule is adapted to: select the position with a phase similar to the phase of the first part of the frequency-domain coefficients of reconstructed signals from the time-domain signal of the prior frame according to the pitch periods set for the reconstructed signals, calculate the frequency-domain phase of the time-domain signal of the prior frame in this position, and use the calculated frequency-domain phase as the frequency-domain phase corresponding to the first part of the frequency-domain coefficients of the reconstructed signals; select the position with a phase similar to the phase of the last part of the frequency-domain coefficients of reconstructed signals from the time-domain signal of the subsequent frame according to the pitch periods set for the reconstructed signals, calculate the frequency-domain phase of the time-domain signal of the subsequent frame in this position, and use the calculated frequency-domain phase as the frequency-domain phase corresponding to the last part of the frequency-domain coefficients of the reconstructed signals.

When the second selecting submodule calculates the phase similar to the phase of the first part of the reconstructed signals, the calculation method is the same as the calculation method applied when the first selecting submodule selects the phase similar to the phase of the reconstructed signal in the prior frame. When the second selecting submodule calculates the phase similar to the phase of the last part of the reconstructed signals, the calculation method is the same as the calculation method applied when the first selecting submodule selects the phase similar to the phase of the reconstructed signal in the subsequent frame.

In the signal reconstruction process in the foregoing embodiments of the present invention, on one hand, a proper window offset S=(TP+TN)/2 is set. Therefore, the window offset is the closest to the pitch period length of the actual signal, and the pitch period of each reconstructed signal is the closest to that of the actual signal. On the other hand, the position of the Fourier transformation window of the prior frame and the subsequent frame is set according to the phase difference between the pitch period of the time-domain signal of the prior frame and the pitch period of the time-domain signal of the subsequent frame. Therefore, the frequency-domain coefficient obtained after the prior frame and the subsequent frame undergo the Fourier transformation is close to the phase of the actual signal, and the phase of the reconstructed signal matches that of the actual signal. In the signal reconstruction process, the pitch periods of reconstructed signals may be set separately. Therefore, the pitch periods of the reconstructed signals take on a gradient trend and are more proximate to the regularity of the pitch periods of the actual voice. Moreover, the phase that is the same as or the most similar to the phase of the reconstructed signal is selected in the prior frame and the subsequent, thus further improving the precision of matching between the phase of the reconstructed signal and the phase of the actual voice signal. To sum up, through the embodiments of the present invention, the inaccuracy of the pitch period and the out-of-sync of the phase in the prior art are overcome.

It is apparent that those skilled in the art can make modifications and variations to the present invention without departing from the spirit and scope of the present invention. The present invention is intended to cover the modifications and variations provided that they fall in the scope of protection defined by the following claims or their equivalents.

What is claimed is:

1. A method for hiding lost packets, comprising:
transforming a time domain signal from a time domain to a frequency domain to obtain a frequency-domain coefficient of the prior frame and a frequency-domain coefficient of the subsequent frame, wherein the time-domain signal is a time-domain signal segment obtained from a frame prior to a lost signal and a frame subsequent to the lost signal respectively according to periodicity of pitch and phase of the signal, and perform;
interpolating values into an amplitude value of the frequency-domain coefficient of the prior frame and an amplitude value of the frequency-domain coefficient of the subsequent frame to obtain an amplitude value of the frequency-domain coefficient of multiple reconstructed signals;
selecting a phase most similar to the phase of the reconstructed signals from the prior frame and/or the subsequent frame as a phase value of the frequency-domain coefficient of the reconstructed signals;
transforming the reconstructed signals from the frequency domain to the time domain according to the amplitude value and the phase value of the frequency-domain coefficient of the reconstructed signals to obtain time-domain signals of the reconstructed signals; and
superposing the time-domain signals of the reconstructed signals to recover the lost signal.

2. The method of claim 1, wherein:
the obtaining of the time-domain signal segment from the frame prior to the lost signal and the frame subsequent to the lost signal respectively according to periodicity of pitch and phase of the signal comprises:
obtaining a pitch period length of the prior frame and/or the subsequent frame, and a phase difference between the prior frame and the subsequent frame;
determining a length of the time-domain signals obtained in the prior frame and the subsequent frame according to the obtained pitch period length; and
determining positions of the time-domain signals obtained in the prior frame and the subsequent frame according to the obtained phase difference.

3. The method of claim 2, wherein:
the length of the time-domain signals obtained in the prior frame and the subsequent frame, which is determined according to the obtained pitch period length, is:
at least twice an approximate average of a sum of a pitch period of the prior frame and a pitch period of the subsequent frame, or at least twice the pitch period of the prior frame, or at least twice the pitch period of the subsequent frame.

4. The method of claim 3, wherein:
the approximate average of the sum of the pitch period of the prior frame and the pitch period of the subsequent frame is an integer obtained by rounding off the average of the sum of the pitch periods.

5. The method of claim 2, wherein:
the determining of the positions of the time-domain signal obtained in the prior frame is determined according to the obtained phase difference comprises: determining a start position of the time-domain signal obtained in the prior frame by moving forward from an end position of the time-domain signal of the prior frame for a length of the phase difference, and then moving forward for a length of the time-domain signal; and
the determining of the positions of the time-domain signal obtained in the subsequent frame is determined according to the obtained phase difference comprises: determining a start position of the time-domain signal obtained in the subsequent frame by moving forward from the end position of the time-domain signal of the prior frame for the length of the phase difference, and then moving backward for a total length of the reconstructed signals.

6. The method of claim 2, wherein:
the obtaining of the phase difference between the prior frame and the subsequent frame comprises:
selecting a segment of continuous sample points before an end position of the time-domain signal of the prior frame, wherein the quantity of the selected sample points is the quantity of the sample points within a pitch period of the prior frame; and selecting a segment of continuous sample points after a start position of the time-domain signal of the subsequent frame;
sliding each sample point of the subsequent frame within a range of sample points of the prior frame, and checking similarity between the sample point of the prior frame and a counterpart of the subsequent frame at each position; and
determining the phase difference between the prior frame and the subsequent frame to be a distance from a first sample point in the subsequent frame to a last sample point in the prior frame at a position where the sample point of the prior frame is the most similar to the counterpart of the subsequent frame.

7. The method of claim 6, wherein:
the checking of the similarity between the sample point of the prior frame and the counterpart of the subsequent frame at each position comprises:
calculating and comparing a sum of absolute values of amplitude differences between corresponding sample points at each position; and determining the position with the most similar sample points to be the position with a minimum sum of the absolute values of the amplitude differences.

8. The method of claim 2, wherein:
the selecting of the phase most similar to the phase of the reconstructed signals from the prior frame and/or the subsequent frame comprises:
selecting the phase of the frequency-domain coefficient of the prior frame or the phase of the frequency-domain coefficient of the subsequent frame; or
dividing the frequency-domain coefficients of the reconstructed signals into two parts, a first part and a last part; for the first part, selecting the phase of the frequency-domain coefficient of the prior frame; and, for the last part, selecting the phase of the frequency-domain coefficient of the subsequent frame.

9. The method of claim 1, wherein:
before transforming the frequency-domain coefficient of the reconstructed signals to that of time-domain signals, the method further comprises:
setting a pitch period for each reconstructed signal, wherein the set pitch periods of the reconstructed signals approach from the pitch period of the prior frame to the pitch period of the subsequent frame gradually.

10. The method of claim 9, wherein:
the selecting of the phase most similar to the phase of each reconstructed signal from the prior frame as the phase value of the frequency-domain coefficient of the reconstructed signals comprises:
selecting a position with a phase similar to the phase of the frequency-domain coefficient of each reconstructed signal from the time-domain signal of the prior frame according to the pitch period set for the reconstructed signal, calculating a frequency-domain phase of the time-domain signal of the prior frame at this position, and using the calculated frequency-domain phase as the frequency-domain phase corresponding to the frequency-domain coefficient of the reconstructed signal.

11. The method of claim 9, wherein:
the selecting of the phase most similar to the phase of each reconstructed signal from the subsequent frame as the phase value of the frequency-domain coefficient of the reconstructed signals comprises:
selecting a position with a phase similar to the phase of the frequency-domain coefficient of each reconstructed signal from the time-domain signal of the subsequent frame according to the pitch period set for the reconstructed signal, calculating a frequency-domain phase of the time-domain signal of the subsequent frame at this position, and using the calculated frequency-domain phase as the frequency-domain phase corresponding to the frequency-domain coefficient of the reconstructed signal.

12. The method of claim 9, wherein:
the selecting of the phase most similar to the phase of each reconstructed signal from the prior frame and the subsequent frame as the phase value of the frequency-domain coefficient of the reconstructed signals comprises:
dividing frequency-domain coefficients of the reconstructed signals into two parts, a first part and a last part;
selecting a position with a phase similar to the phase of the first part of the frequency-domain coefficients of the reconstructed signals from the time-domain signal of the prior frame according to the pitch periods set for the reconstructed signals, calculating a frequency-domain phase of the time-domain signal of the prior frame at this position, and using the calculated frequency-domain phase as the frequency-domain phase corresponding to the first part of the frequency-domain coefficients of the reconstructed signals; and
selecting a position with a phase similar to the phase of the last part of the frequency-domain coefficients of the reconstructed signals from the time-domain signal of the subsequent frame according to the pitch periods set for the reconstructed signals, calculating a frequency-domain phase of the time-domain signal of the subsequent frame at this position, and using the calculated frequency-domain phase as the frequency-domain phase corresponding to the last part of the frequency-domain coefficients of the reconstructed signals.

13. The method of claim 9, further comprising:
when a total length of the set pitch periods of the reconstructed signals is less than a total length of the actually required pitch periods of the reconstructed signals, adjusting the set pitch period length of each reconstructed signal to increase the pitch period length until the total length of the set pitch periods is equal to the total length of the actually required pitch periods; and
when the total length of the set pitch periods of the reconstructed signals is greater than the total length of the actually required pitch periods of the reconstructed signals, adjusting the set pitch period length of each reconstructed signal to decrease the pitch period length until the total length of the set pitch periods is equal to the total length of the actually required pitch periods.

14. A system for hiding lost packets, comprising:
a time-frequency domain transforming module, adapted to: transform a time domain signal from a time domain to a frequency domain to obtain a frequency-domain coefficient of the prior frame and a frequency-domain coefficient of the subsequent frame, wherein the time-domain signal is a time-domain signal segment obtained from a frame prior to a lost signal and a frame subsequent to the lost signal respectively according to periodicity of pitch and phase of the signal, and perform:
a reconstructed signal frequency-domain coefficient calculating module, adapted to: interpolate values into an amplitude value of the frequency-domain coefficient of the prior frame and an amplitude value of the frequency-domain coefficient of the subsequent frame to obtain an amplitude value of the frequency-domain coefficient of multiple reconstructed signals;
a reconstructed signal frequency-domain phase selecting module, adapted to: select a phase most similar to the phase of the reconstructed signals from the prior frame and/or the subsequent frame as a phase value of the frequency-domain coefficient of the reconstructed signals;
a frequency-time domain transforming module, adapted to: transform the reconstructed signals from the frequency domain to the time domain according to the amplitude value and the phase value of the frequency-domain coefficient of the reconstructed signals to obtain time-domain signals of the reconstructed signals; and
a signal recovering module, adapted to superpose the time-domain signals of the reconstructed signals to recover the lost signal.

15. The system of claim 14, wherein the time-frequency domain transforming module comprises:
a phase difference obtaining submodule, adapted to obtain a phase difference between the prior frame and the subsequent frame;

a pitch period obtaining submodule, adapted to obtain a pitch period length of the prior frame and/or the subsequent frame;

a length determining submodule, adapted to determine a length of the time-domain signals obtained in the prior frame and the subsequent frame according to the obtained pitch period length; and a position determining submodule, adapted to determine positions of the time-domain signals obtained in the prior frame and the subsequent frame according to the obtained phase difference.

16. The system of claim 15, wherein:
the length of the time-domain signals determined by the length determining submodule is: at least twice an approximate average of a sum of a pitch period of the prior frame and a pitch period of the subsequent frame, or at least twice the pitch period of the prior frame, or at least twice the pitch period of the subsequent frame.

17. The system of claim 15, wherein:
a start position of the time-domain signal obtained in the prior frame determined by the position determining submodule is: the position determined by moving forward from an end position of the time-domain signal of the prior frame for a length of the phase difference, and then moving forward for a length of the time-domain signal; and a start position of the time-domain signal obtained in the subsequent frame determined by the position determining submodule is: the position determined by moving forward from the end position of the time-domain signal of the prior frame for the length of the phase difference, and then moving backward for a total length of the reconstructed signals.

18. The system of claim 14, wherein the reconstructed signal frequency-domain phase selecting module comprises:
a selecting submodule, adapted to: select the phase of the frequency-domain coefficient of the prior frame or the phase of the frequency-domain coefficient of the subsequent frame.

19. The system of claim 14, wherein the reconstructed signal frequency-domain phase selecting module comprises:
a dividing submodule, adapted to divide the frequency-domain coefficients of the reconstructed signals into two parts, a first part and a last part; and
a selecting submodule, adapted to: select the phase of the frequency-domain coefficient of the prior frame for the first part of the frequency-domain coefficients of the reconstructed signals, and select the phase of the frequency-domain coefficient of the subsequent frame for the last part of the frequency-domain coefficients of the reconstructed signals.

20. The system of claim 14, wherein: the system further comprises:
a reconstructed signal pitch period setting module, adapted to set a pitch period for each reconstructed signal, wherein the set pitch periods of the reconstructed signals approach from the pitch period of the prior frame to the pitch period of the subsequent frame gradually.

21. The system of claim 20, wherein the reconstructed signal frequency-domain phase selecting module comprises:
a selecting submodule, adapted to: select a position with a phase similar to the phase of the frequency-domain coefficient of each reconstructed signal from the time-domain signal of the prior frame according to the pitch period set for the reconstructed signal, calculate a frequency-domain phase of the time-domain signal of the prior frame at this position, and use the calculated frequency-domain phase as the frequency-domain phase corresponding to the frequency-domain coefficient of the reconstructed signal.

22. The system of claim 20, wherein the reconstructed signal frequency-domain phase selecting module comprises:
a selecting submodule, adapted to: select a position with a phase similar to the phase of the frequency-domain coefficient of each reconstructed signal from the time-domain signal of the subsequent frame according to the pitch period set for the reconstructed signal, calculate a frequency-domain phase of the time-domain signal of the subsequent frame at this position, and use the calculated frequency-domain phase as the frequency-domain phase corresponding to the frequency-domain coefficient of the reconstructed signal.

23. The system of claim 20, wherein the reconstructed signal frequency-domain phase selecting module comprises:
a dividing submodule, adapted to divide frequency-domain coefficients of the reconstructed signals into two parts, a first part and a last part; and
a selecting submodule, adapted to: select a position with a phase similar to the phase of the first part of the frequency-domain coefficients of reconstructed signals from the time-domain signal of the prior frame according to the pitch periods set for the reconstructed signals, calculate a frequency-domain phase of the time-domain signal of the prior frame at this position, and use the calculated frequency-domain phase as the frequency-domain phase corresponding to the first part of the frequency-domain coefficients of the reconstructed signals; select a position with a phase similar to the phase of the last part of the frequency-domain coefficients of reconstructed signals from the time-domain signal of the subsequent frame according to the pitch periods set for the reconstructed signals, calculate a frequency-domain phase of the time-domain signal of the subsequent frame at this position, and use the calculated frequency-domain phase as the frequency-domain phase corresponding to the last part of the frequency-domain coefficients of the reconstructed signals.

24. The system of claim 20, wherein the reconstructed signal pitch period setting module comprises:
a first adjusting submodule, adapted to: when a total length of the set pitch periods of the reconstructed signals is less than a total length of the actually required pitch periods of the reconstructed signals, adjust the set pitch period length of each reconstructed signal to increase the pitch period length until the two total lengths are equal; and
a second adjusting submodule, adapted to: when the total length of the set pitch periods of the reconstructed signals is greater than the total length of the actually required pitch periods of the reconstructed signals, adjust the set pitch period length of each reconstructed signal to decrease the pitch period length until the two total lengths are equal.

25. The system of claim 14, wherein:
the time-frequency domain transforming module is a Fourier transforming module, and the frequency-time domain transforming module is an inverse Fourier transforming module.

* * * * *